(12) United States Patent
Hanagami et al.

(10) Patent No.: US 12,339,729 B2
(45) Date of Patent: Jun. 24, 2025

(54) GENERAL PURPOSE INPUT/OUTPUT (GPIO) SUPPLY HARVESTING

(71) Applicant: Apple Inc., Cupertino, CA (US)

(72) Inventors: Nathan F Hanagami, San Francisco, CA (US); Maryam Mortazavi, Austin, TX (US); Ruopeng Wang, San Jose, CA (US); Ludmil N Nikolov, Chippenham (GB); Floyd L Dankert, Austin, TX (US); Enrico Zanetti, Cascina (IT); Jianbao Wang, Tucson, AZ (US); Kiranjit Dhaliwal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/478,355

(22) Filed: Sep. 29, 2023

(65) Prior Publication Data
US 2025/0110543 A1  Apr. 3, 2025

(51) Int. Cl.
  *G06F 1/3234* (2019.01)
  *G06F 1/324* (2019.01)
  *G06F 1/3287* (2019.01)
  *G06F 1/3296* (2019.01)

(52) U.S. Cl.
  CPC ............ *G06F 1/3278* (2013.01); *G06F 1/324* (2013.01); *G06F 1/3287* (2013.01); *G06F 1/3296* (2013.01)

(58) Field of Classification Search
  CPC ....... G06F 1/3296; G06F 1/324; G06F 1/3287
  See application file for complete search history.

(56) References Cited

U.S. PATENT DOCUMENTS

| | | |
|---|---|---|
| 9,020,459 B2 | 4/2015 | Waters et al. |
| 9,429,468 B2 | 8/2016 | Rueger et al. |
| 9,471,140 B2 | 10/2016 | Shin et al. |
| 10,088,893 B2 | 10/2018 | Kulathumani et al. |
| 10,795,425 B2 | 10/2020 | Hanson et al. |
| 11,467,614 B2 | 10/2022 | Wang et al. |

(Continued)

FOREIGN PATENT DOCUMENTS

| | | |
|---|---|---|
| CN | 116166058 A | 5/2023 |
| EP | 2769275 B1 | 8/2014 |

(Continued)

OTHER PUBLICATIONS

International Search Report and Written Opinion for PCT Application No. PCT/US2024/046258 dated Dec. 19, 2024; 14 pgs.

*Primary Examiner* — Terrell S Johnson
(74) *Attorney, Agent, or Firm* — Fletcher Yoder, P.C.

(57) ABSTRACT

Systems and methods described herein correspond to supply harvesting operations. Power management circuitry may receive a supply voltage from other power management circuitry. This supply voltage may be a harvested supply from the other power management circuitry. Moreover, some of the power management circuitry may be operated as controller power management circuitry to supply the supply voltage via one or more rails and some of the power management circuitry may be operated as leaf power management circuitry to harvest the supply voltage from the one or more rails. Leaf power management circuitry may exclude a regulator, enabling that leaf power management circuitry to be entered into a lower power mode than previously enabled when the regulator was included.

21 Claims, 9 Drawing Sheets

(56) References Cited

U.S. PATENT DOCUMENTS

| | | | |
|---|---|---|---|
| 2015/0253790 A1* | 9/2015 | Gallina | H02M 3/156 323/293 |
| 2018/0081412 A1 | 3/2018 | Sato et al. | |
| 2019/0094949 A1* | 3/2019 | Kurian | G06F 1/3296 |
| 2020/0144839 A1 | 5/2020 | De Vos et al. | |
| 2020/0280256 A1 | 9/2020 | Du et al. | |
| 2022/0100247 A1* | 3/2022 | Garg | G06F 1/324 |
| 2022/0393653 A1 | 12/2022 | Zampardi, Jr. et al. | |
| 2022/0415368 A1 | 12/2022 | Rowley | |
| 2023/0064867 A1 | 3/2023 | Gajda et al. | |

FOREIGN PATENT DOCUMENTS

| | | |
|---|---|---|
| WO | 2013058820 A1 | 4/2013 |
| WO | 2021258391 A1 | 12/2021 |

\* cited by examiner

GENERAL PURPOSE INPUT/OUTPUT (GPIO) SUPPLY HARVESTING

BACKGROUND

This disclosure relates to systems and methods to power management circuitry of a semiconductor device and, more particularly, a general purpose input/output (GPIO) of the power management circuitry.

Integrated circuits are found in a vast array of electronics devices, including computers, handheld devices, wearable devices, vehicles, robotics, and more. An electronic device may be operated into various operational modes, such as an always-on display mode, a powered off mode, and a normal mode, among others. In some systems, circuit blocks designed to perform various functions may be designed to operate at different power supply levels. Power management circuitry may be included in such systems to generate and monitor varying power supply levels on the power supply nodes for the different circuit blocks.

Power management circuits sometimes include one or more power converter circuits that generate regulated voltage levels on respective power supply signals using a voltage level of an input power supply signal. Such regulator circuits may employ different operations to regulate the voltage level of power nodes. For example, a power converter may be a switching regulator, a linear regulator, or another suitable regulator. Yet operating these power circuits in different modes could result in power being removed from one or more power converters, which may cause a general purpose input/output circuit (GPIO) to lose a bias and/or to no longer be operated in a blocking state.

SUMMARY

Computer systems may include multiple circuits to perform specific operations. The circuits may be fabricated on one or more substrates and may use different power supply voltage levels. Power Management Units (PMUs) may include multiple power converter circuits that generate regulated voltage levels for various power supply signals. Such power converter circuits may be designed to keep a voltage constant in view of changes in input voltage or circuit load. As part of this, the PMU may include interfaces, like general purpose input/output (IOs) which may include one or more pins, where a respective GPIO pin may be programmed into an input terminal or an output terminal. To program a GPIO pin as an input, the GPIO pin may be set to a high-impedance state (e.g., a higher impedance state, a state corresponding to an impedance greater than a threshold impedance) that enables sensing of whether the voltage on the GPIO pin is considered a high voltage level (e.g., "1" bit, high logic value) or a low voltage level (e.g., "0" bit, low logic value). The high-impedance state may correspond to an impedance of suitable value (e.g., at least a threshold value of impedance) to block undesired or unexpected signals from being received via the GPIO pin (and propagated through connected circuitry).

Although the power converter circuits may keep a constant voltage output, an electronic device may be operated in various operational modes, such as an always-on display mode, a power off mode, a reduced power mode, and a normal mode, among others. These different operational modes may consume different amounts of power, which may lead to the power converter circuits changing in operation to supply power to the circuits while in the various operational modes. Indeed, GPIOs of the PMUs may send or receive control signals, statuses, indications of events, or the like to communicate the transition between the different operational modes, to perform testing or debugging operations, or the like.

In one example reduced power mode, the integrated circuit may be operated in a retention mode. The retention mode may be used to retain one or more memory states and/or memory caches, maintain statuses, continue providing an always-on display, or other operations that may correspond to an "auto-pilot" mode that enables one or more circuits to be powered down while functions or applications continue to be provided to a user. Similar to a power off mode, a PMU of an electronic device may stop supplying power to one or more portions of the electronic device while operated in the retention mode. However, the retention mode may differ from a power off mode in that system interrupts may be generated to cause the electronic device to exit from the retention mode and not be used to cause the electronic device to exit from the power off mode (e.g., interrupts may not be generated while the electronic device 10 is in a power off mode).

With this in mind, entering the retention mode may entail removing power to a regulator, such as a linear or low-dropout regulator (LDO), associated with the PMU. When the regulator is powered off, a GPIO may lose the bias for the well and gate of the GPIO (e.g., a well terminal, a gate terminal). When lost, the GPIO may no longer be held at a high impedance. The GPIO may transition instead to a low-impedance state able to propagate unintended signals to the integrated circuit and corrupt the data on the associated GPIO interface bus. Indeed, when the GPIO is not in a high-impedance blocking state, signals received via the GPIO may no longer be blocked by the high impedance, impacting the functionality of the chip and reducing integrated circuit reliability.

Systems and methods that preserve the GPIO in a high-impedance state while also enabling the integrated circuit to be operated in a reduced-power mode may be desired. As described herein, these systems and methods may include supply harvesting operations. For example, one or more PMUs may receive a supply voltage from one or more other PMUs. This supply voltage may be a harvested supply from the one or more other PMUs. Moreover, in some systems, one or more PMUs may be operated as a controller PMU to supply the supply voltage via one or more rails and one or more PMUs may be operated as leaf PMUs to harvest the supply voltage from the one or more rails. In some systems, the respective PMUs may not switch between harvesting or controller modes. For a first PMU that harvests the supply voltage from a second PMU, one or more regulators of the first PMU may be disconnected from a power supply while one or more regulators of the second PMU may remain powered on. The first PMU disconnected from the power supply may maintain a high-impedance state of a GPIO disposed on the first PMU since the supply voltage continues to be received from at least one regulator of the second PMU.

BRIEF DESCRIPTION OF THE DRAWINGS

Various aspects of this disclosure may be better understood upon reading the following detailed description and upon reference to the drawings described below.

DETAILED DESCRIPTION

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
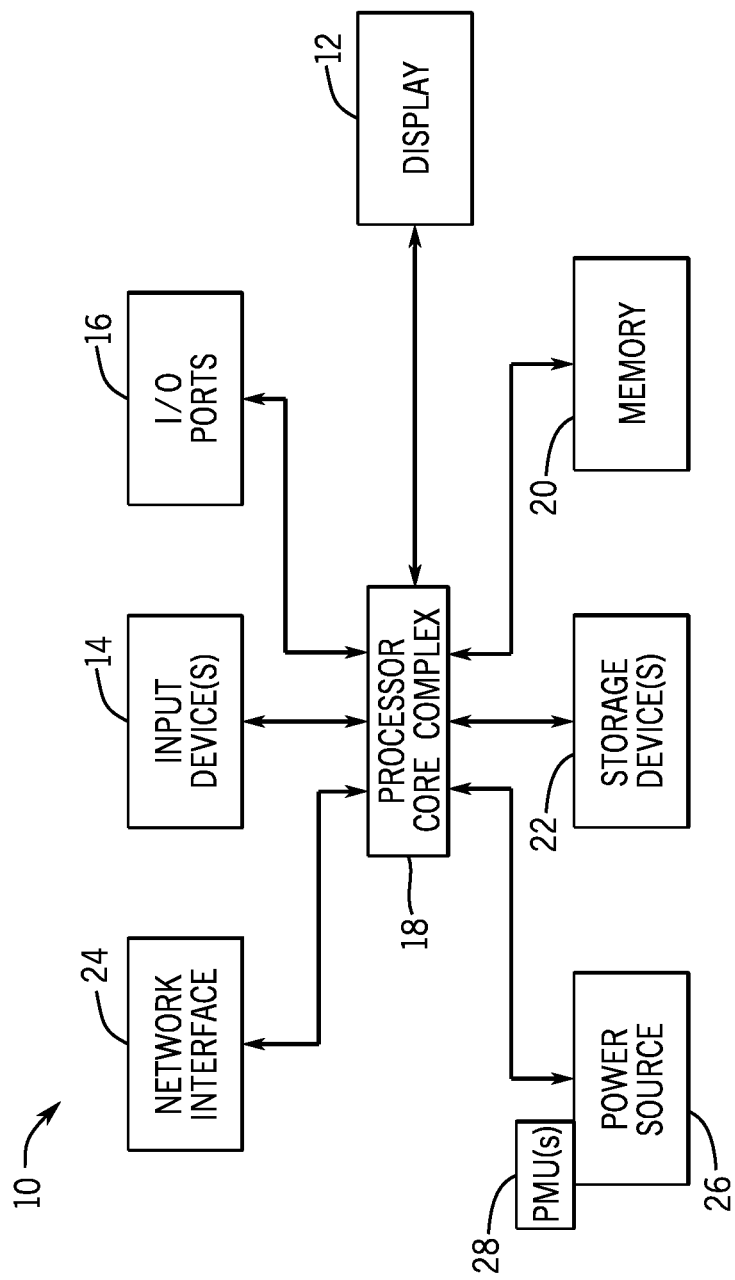
FIG. 1 is a schematic block diagram of an electronic device, in accordance with an embodiment.

This disclosure relates to an electronic device that includes a power management unit (PMU). The electronic device 10 may be any suitable electronic device, such as a computer, a mobile phone, a portable media device, a tablet, a television, a virtual-reality headset, a wearable device such as a watch, a vehicle and/or vehicle dashboard, or the like. FIG. 1 is intended to represent one example of a particular implementation and is intended to illustrate the types of components that may be present in the electronic device 10.

The electronic device 10 of FIG. 1 includes an electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and a power management unit (PMU) 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. One or more PMU(s) 28 may help distribute power to various circuitries of the electronic device 10. Although multiple PMUs 28 may be described herein, for ease of description, these multiple PMUs 28 may sometimes be referred to herein as the PMU 28. Some descriptions included herein may apply to systems with one PMU and/or to systems with multiple PMUs. Furthermore, PMUs 28 may include different components relative to each other, for example some PMUs 28 may include regulators while other PMUs 28 may not include regulators, as is described further herein.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch-sensing components may receive user inputs by detecting occurrence or position of an object touching the surface of the electronic display 12.

Figure 2:
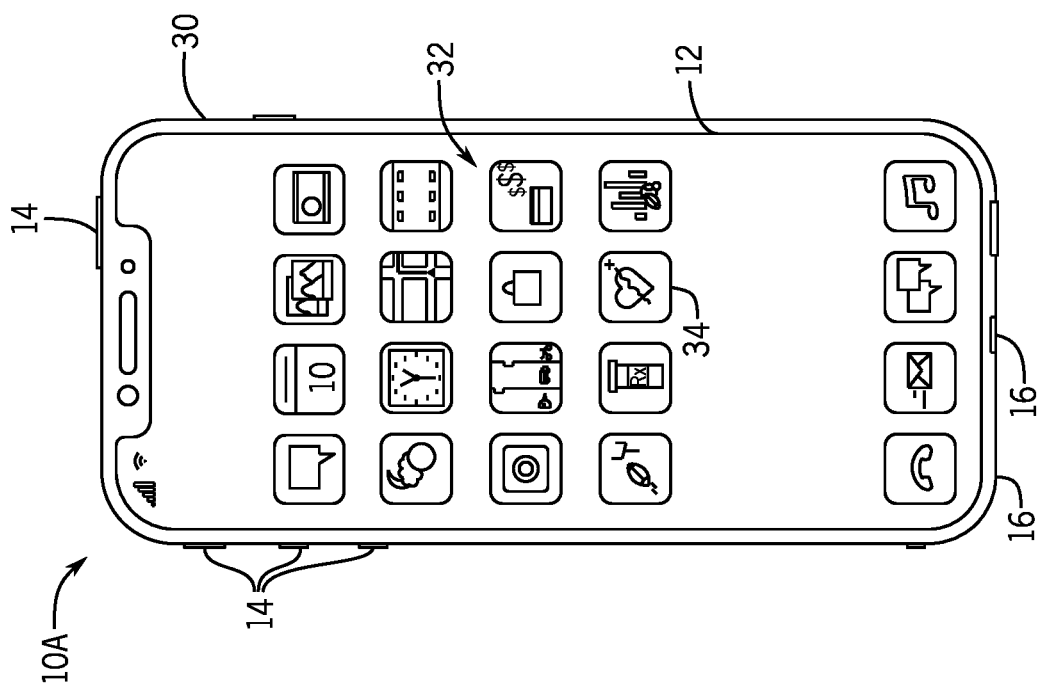
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smartphone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
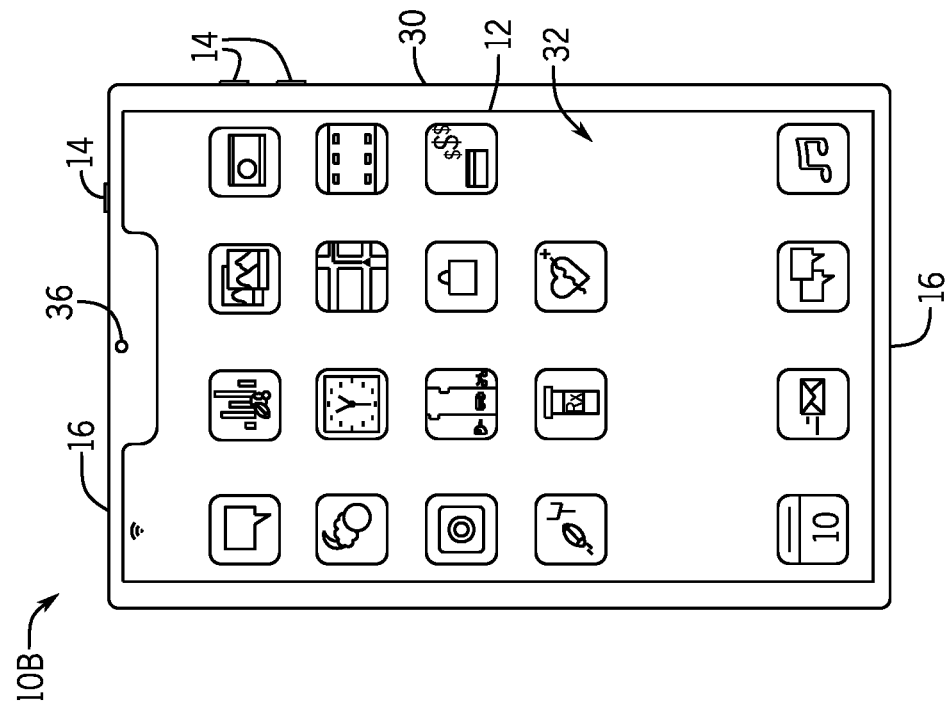
FIG. 3 is a front view of a tablet device representing an example of the electronic device of FIG. 1, in accordance with an embodiment.
Figure 4:
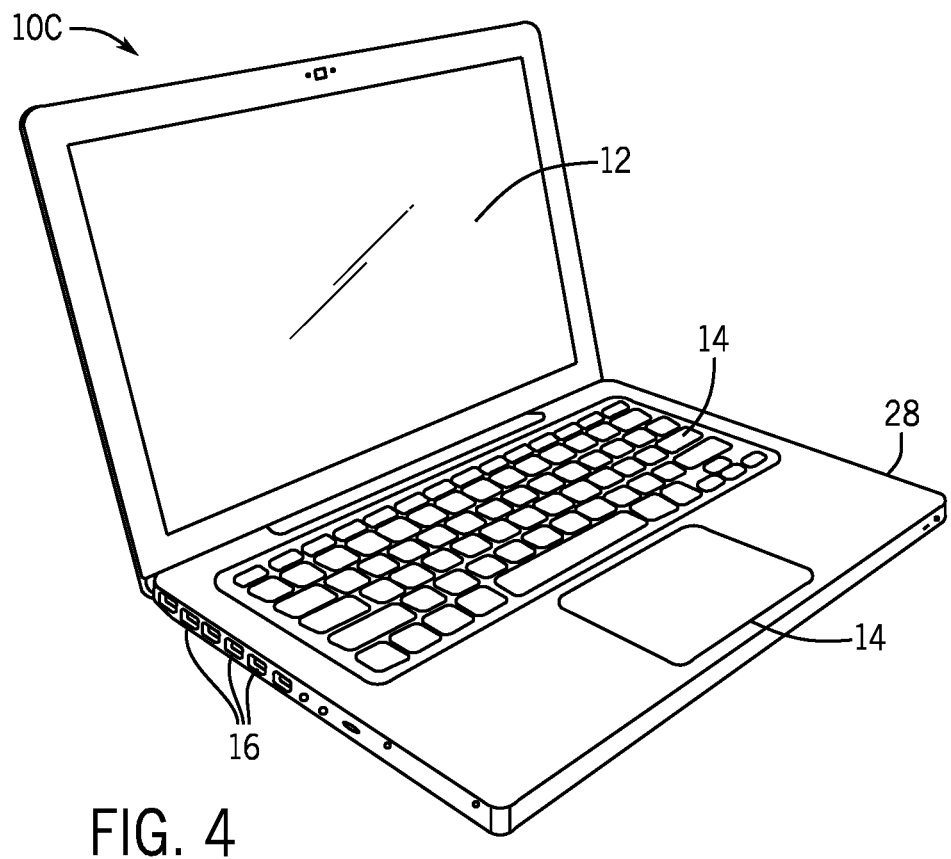
FIG. 4 is a front view of a notebook computer representing an example of the electronic device of FIG. 1, in accordance with an embodiment.
Figure 5:
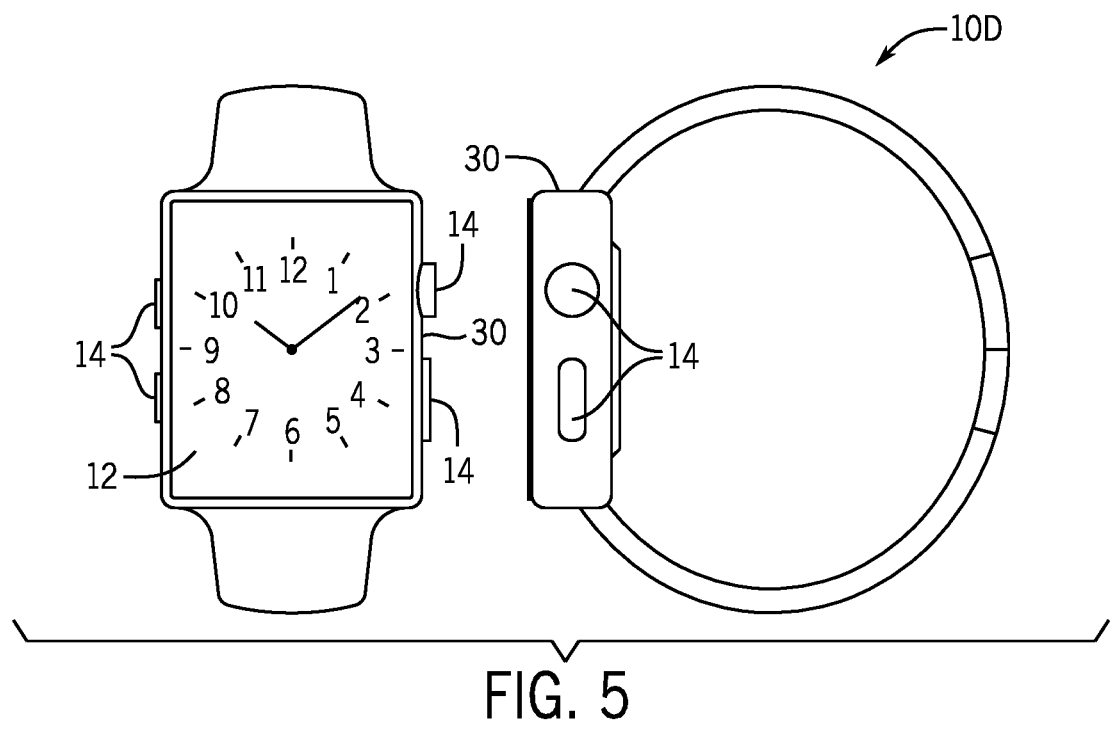
FIG. 5 are front and side views of a watch representing an example of the electronic device of FIG. 1, in accordance with an embodiment.

Another example of a suitable electronic device 10, specifically, a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Referring back to FIG. 1, circuitry of the electronic device 10, such as those illustrated in FIG. 1, may be fabricated on one or more substrates and may employ different power source 26 voltage levels. The PMU 28 may control and/or monitor signals delivering the electrical power from the power source 26, which may be done based on one or more voltage regulator circuits that generate regulated voltage levels to be delivered to the various circuitries of the electronic device 10. For example, the PMU 28 may adjust the electrical power delivered to one or more domains, such as an analog domain, a digital domain, or the like. The PMU 28 may adjust the voltage levels based on operational modes instructed by the processor core complex 18 and/or based on expected or desired energy consumption levels of one or more different components or systems of the electronic device 10.

Such voltage regulator circuits may employ both passive circuit elements (e.g., inductors, capacitors) as well as active circuit elements (e.g., transistors, diodes). Different types of voltage regulator circuits may be employed based on power requirements of load circuits, available circuit area, and the like. One type of voltage regulator circuit is a buck converter circuit (e.g., buck regulator), such as the buck regulator depicted in FIGS. 8-10 and discussed herein. Other regulators may be used.

Figure 6:
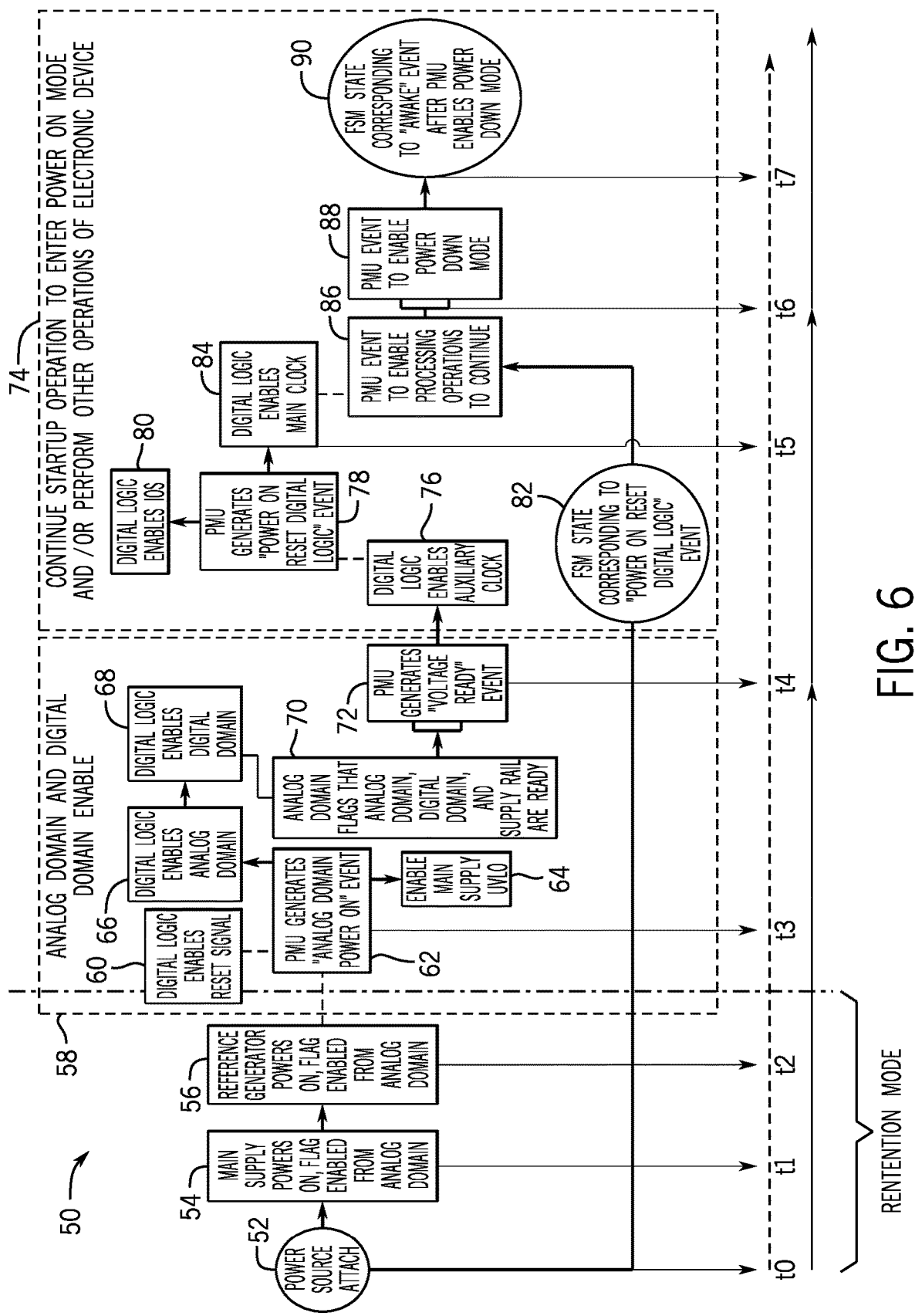
FIG. 6 is a schematic diagram of operations of an integrated circuit associated with exiting from a retention mode (e.g., an example reduced power mode), in accordance with an embodiment.

Keeping the foregoing in mind, during operation of the electronic device 10, the electronic device 10 may enter a retention mode. FIG. 6 is a timing diagram 50 of operations 52-88 performed over times t0-t7 associated with a retention mode of the electronic device 10. Example operations are described herein in association with the retention mode. In an actual implementation of a system, one or more of the operations may be adjusted or omitted based on the specific configurations and/or uses of that system.

The retention mode may generally be an operational mode where an analog domain and a digital domain of the electronic device 10 are disconnected from the power source 26. The analog domain may refer to analog circuitry of the electronic device 10 and/or one or more portions of analog circuitry of the electronic device 10. The digital domain may refer to digital circuitry of the electronic device 10 and/or one or more portions of digital circuitry of the electronic device 10. The analog domain may be supplied power separately by the PMU(s) 28 because the analog domain may have different voltage and/or current requirements relative to voltage and/or current requirements of the digital domain. Disconnecting the analog domain and/or the digital domain from the power source 26 may reduce an amount of energy consumed by the electronic device 10 when compared to an amount of energy consumed while in one or more other operational modes, such as a normal operational mode. For example, in the normal operational mode, the analog domain and the digital domain may be connected to the power source 26. The retention mode may correspond to a time duration between t0, when a power source is attached to the PMU 28, and time t3 when the PMU 28 generates an "analog domain power on" event to enable the analog domain. It is noted that an event, such as the "analog domain power on" event or one of the other events described herein, may correspond to an interrupt that may wake up or change an operational mode of one or more circuitries that receives the event.

At block 52 and time to, the power source 26 may attach to the PMU 28, where attach may refer to an electrical coupling that enables the power source 26 to electrically connect and supply power to the PMU 28. In response, at block 54 and time t1, the analog domain may provide a flag and/or an event without the analog domain being fully powered on. Indeed, the power source 26 attaching to the PMU 28 may power on a comparator associated with a VDD_MAIN voltage rail (e.g., a main power supply rail associated with the analog domain). The analog domain may provide the flag and/or the event in response to the VDD_MAIN voltage rail reaching a threshold voltage level. At block 56 and at time t2, in response to the main supply powering on, another flag may be generated from the analog domain causing a reference generator to power on. Operations of block 58 may be associated with enabling the analog domain and the digital domain powered by the PMU 28. Indeed, at block 60, digital logic of the electronic device 10 may provide a RESET signal at block 62. The RESET signal of block 62 may correspond to RESET_L signal 112 of FIG. 8.

Figure 7:
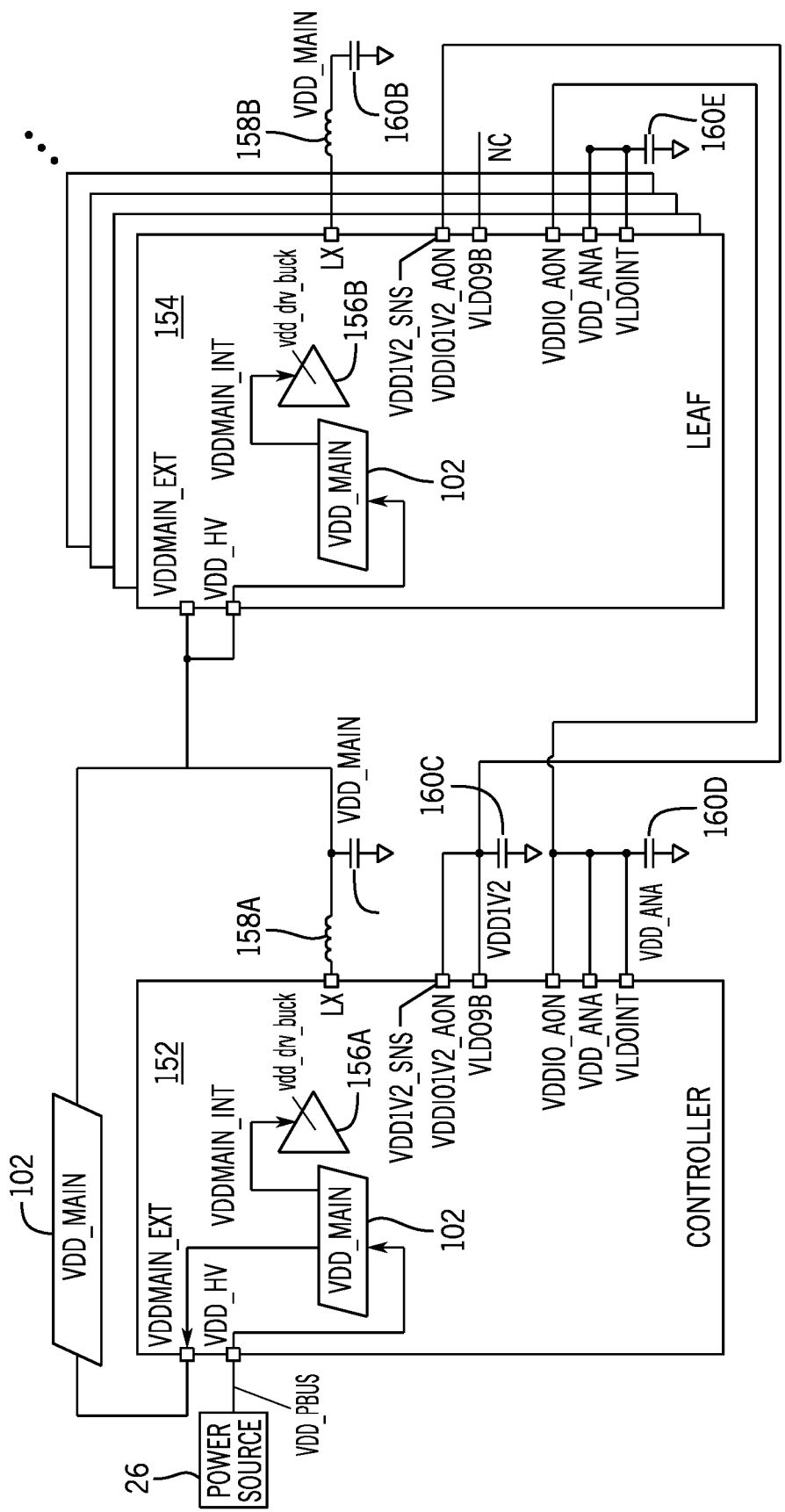
FIG. 7 is a block diagram of a leaf power management unit (PMU) operable to harvest a supply voltage from a controller PMU while in the retention mode based on a first coupling, in accordance with an embodiment.

In response to the RESET signal, at block 62, the PMU 28 may generate an "analog domain power on" event that, at block 64, may enable a main supply undervoltage lockout (UVLO), that, at block 66, may enable the analog domain, and that, at block 68, may enable the digital domain. Indeed, digital logic coupled to the PMU 28 or associated with the PMU 28 may enable the analog domain and/or the digital domain in response to the "analog domain power on" event from the PMU 28. The digital logic referenced herein (e.g., blocks 60, 66) may be disposed on or as part of chip logic. Logic used to drive the Reset_L pin may be disposed separately from the chip logic. The UVLO may prevent an integrated circuit from being used at voltages lower than a specification voltage associated with the integrated circuit, which may be beneficial when protecting the integrated circuit from malware or unexpected operation. Enabling the analog domain may correspond to the digital logic enabling a regulator (e.g., LDO) of the analog domain to initiate powering circuitry of the analog domain. The VDD_ANA signal 108 of FIG. 8 may supply voltage to the analog domain. The VDD_ANA signal 108 having a voltage greater than or equal to the voltage threshold level 146A may enable the analog domain. Enabling the digital domain may correspond to digital logic associated with the PMU 28 enabling a regulator (e.g., LDO) to initiate powering circuitry of the digital domain. The VDD_DIG signal 110 of FIG. 8 may supply voltage to the digital domain. The VDD_DIG signal 110 having a voltage greater than or equal to the voltage threshold level 146B may enable the digital domain. Indeed, the digital domain supply voltage (e.g., VDD_DIG signal 110) may be generated from another regulator from VDD_MAIN. Voltage provided by this regulator may be substantially equal to the VDD_ANA voltage (e.g., as illustrated in FIG. 7) or differ by negligible amount (e.g., 1% variance or other threshold variance), may be equal to an additional regulator that powers up after the VDD_ANA regulator and generates a digital domain voltage, which may have a different voltage value, (e.g., as illustrated in FIG. 9).

Figure 8:
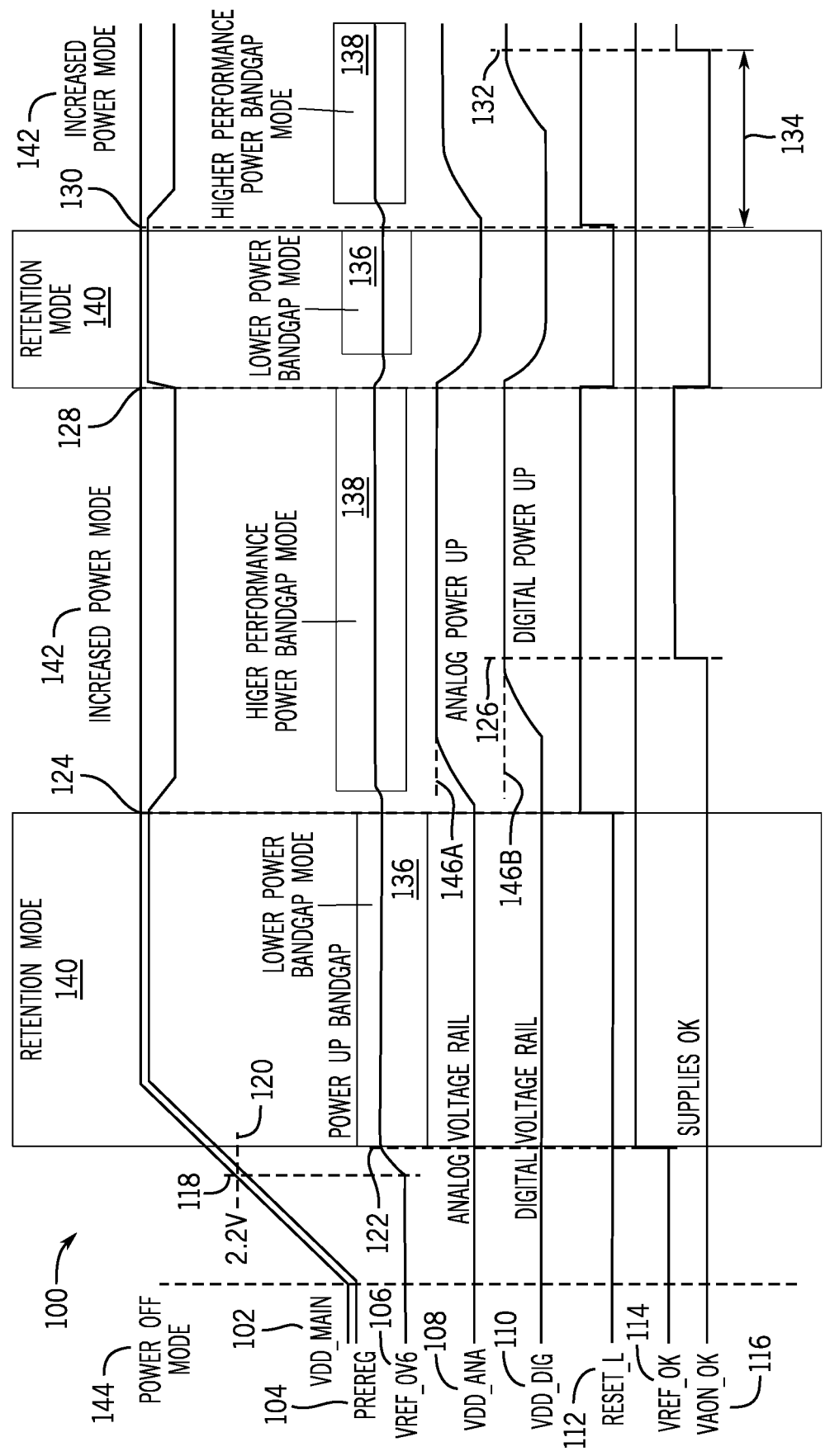
FIG. 8 is a timing diagram that illustrates signal states associated with the retention mode, in accordance with an embodiment.
Figure 9:
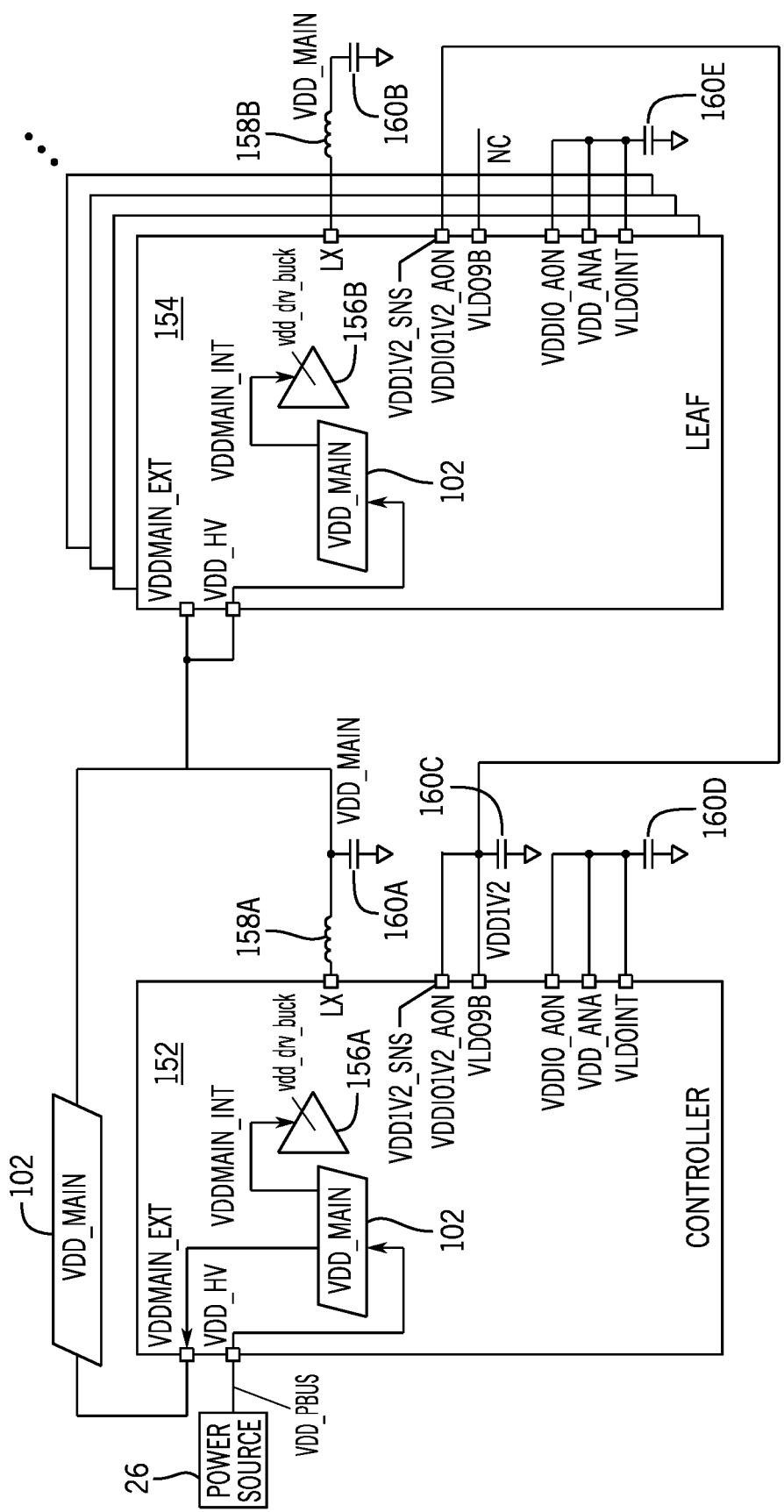
FIG. 9 is a block diagram of the leaf PMU operable to harvest the supply voltage from the controller PMU while in the retention mode based on a second coupling, in accordance with an embodiment.

Elaborating further on example relationships between blocks 64, 66, and 68, the digital domain may be enabled at block 68 with the VDD_ANA voltage triggered in response to a VDD_MAIN_OK signal generated with operations of block 54 to indicate that the VDD_MAIN supply rail supplies a threshold voltage level (e.g., level 120 of FIG. 8, any suitable threshold voltage for that electronic device 10). As noted above, the VDD_ANA voltage may be supplied based on operations of block 66. The digital domain may be enabled at block 68 additionally in response to logic detecting that the bandgap has reached a threshold voltage difference, which may be indicated by VREF_0V6 signal 106 from FIG. 8. In some systems, like those described in FIG. 9, the digital domain may be enabled at block 68 based on a supply provided from a second LDO, which may be triggered in response to the operations of block 54 based on a first LDO associated with the analog domain (e.g., powered on based on operations of block 66). The first LDO may be triggered by the VDDMAIN_OK signal described above. The first LDO may be enabled additionally in response to logic detecting that the bandgap has reached a threshold voltage difference, which may be indicated by VREF_0V6 signal 106 from FIG. 8.

At block 70, the analog domain may provide a flag and/or an event in response to determining that the regulator (e.g., LDO) of the analog domain, the regulator (e.g., LDO) of the digital domain, and/or a supply rail (e.g., VDDIO1V2_AON of FIG. 7) are ready. In some systems, the PMU 28 may generate the flag and/or the event as opposed to the analog domain, such as in response to detecting that the analog domain, the digital domain, and the supply rail are provided a threshold amount of voltage, current, and/or power. In either case, the flag and/or event may be generated based on one or more comparators performing related voltage comparisons to thresholds to indicate that the regulator of the analog domain, the regulator of the digital domain, and/or the supply rail are supplying suitable voltage levels. In response to the flag or the event, at block 72, the PMU 28 may generate a "voltage ready" event to trigger at time t4. At block 74, the PMU 28 and/or the electronic device 10 may continue performing additional start-up operations to enter a power on mode and/or to perform other operations.

For example, at block 76, in response to the PMU 28 generating the "voltage ready" event, digital logic may provide a clock that operates one or more circuitries of the electronic device 10, such as an auxiliary clock. The digital logic may be digital logic associated with the digital domain, the PMU 28, or the like. The PMU 28 may, at block 78, generate a "power on reset digital logic" event, which may trigger a finite state machine (FSM) to advance to a state corresponding to the "power on reset digital logic" event. In response to the "power on reset digital logic" event, at block 80, the digital logic may enable one or more input/outputs (IOs), such as GPIOs of the PMUs 28. Furthermore, in response to the "power on reset digital logic" event, at time t5 at block 84, the digital logic may provide a main clock of the electronic device 10. The main clock enabling may, at block 86, trigger the PMU 28 to generate an event to cause processing operations to continue of the electronic device 10 (e.g., based on the enabled main clock). At a later time, at block 88, the PMU 28 may generate another event to cause the electronic device 10 to set a timer and enter a reduced power mode, such as a retention mode. The timer may be set around time t6 to expire at time t7. The reduced power mode may end when the timer expires (e.g., at time t7), causing the PMU 28 to awake on again at block 90. In some cases, the timer expiring enables the reduced power mode to be ended in response to an interrupt being received by the finite state machine and/or the PMU 28. The block 90 may correspond to the finite state machine transitioning to an "awake" state from the reduced power mode.

As noted above, the electronic device 10, at block 88, may enter a reduced power mode that corresponds to a retention mode. The retention mode may be similar to a power off mode in that the PMU 28 may stop supplying power to one or more portions of the electronic device 10 but differs in that system interrupts may be generated to cause the electronic device 10 to exit from the retention mode (e.g., interrupts may not be generated to wake the electronic device 10 while in a power off mode). The retention mode may be used to retain one or more memory states and/or memory caches, maintain statuses, continue providing an always-on display, or other operations that may correspond to an "auto-pilot" mode that enables one or more circuities to be powered down. In some cases, the circuitries include the analog domain and/or the digital domain. To consume smaller amounts of power when a domain is removed from power in the retention mode, it may be desired to power down (e.g., remove power from or eliminate) a regulator of the PMU 28 that supplies power to that domain. In some cases, the regulator is a linear regulator, a low-dropout regulator (LDO), a buck regulator, or the like associated with power management operations of the PMU 28. When the regulator stops receiving power from the power source 26, a bias of general purpose input/outputs (GPIOs) of the PMU 28 may be lost, which, as described above, may be undesirable. Indeed, under these conditions, unintended signal spikes may be received at the GPIO when not blocking and propagate to one or more portions of the electronic device 10. When the GPIO is not a failsafe GPIO, activity on a rail may be unable to be blocked unless the GPIO is in a blocking state, such as has a bias on its gate voltage and well voltage and/or has the GPIO pin pulled to a logic high voltage level (e.g., "1"). Furthermore, when the regulator is removed from a design of the PMU 28, there may be no alternative in the design to continue to supply power to GPIOs of the PMU 28 to preserve a blocking state of the pins (e.g., bias, high-impedance (Hi-Z), a threshold amount of impedance). To cure this, a supply voltage may be harvested to maintain the blocking state of GPIO pins. Supply harvesting and additional systems and methods are described below with reference to FIGS. 7-11.

Indeed, FIG. 7 is a block diagram of a leaf PMU 28 (e.g., leaf PMU 154) operable to harvest a supply voltage from a controller PMU 28 (e.g., controller PMU 152) while in the retention mode based on a first coupling.

In this system, the leaf PMU 154 harvests two voltage supplies from the leader PMU 152—one from a first always-on (AON) supply rail and another from a second always-on (AON) supply rail, which may provide voltage to one or more leaf PMUs 28 during the retention mode. When the leaf PMU 154 is in the retention mode, the GPIOs may not be functional but may remain biased in a higher-impedance state. In this way, if any communication occurs on the GPIO interface, the input pins for the powered down leaf PMU may not interfere with the communication that may occur on the shared GPIO bus.

The first AON voltage supply is from a VDDIO1V2_AON pin, which may provide a first voltage on its connected rail. The first voltage may correspond to 9 volts (V), a voltage between 8V and 10V, a voltage greater than 5V, or the like. Indeed, despite this pin referred to herein as the "VDDIO1V2_AON pin," it should be understood that any suitable voltage and not merely 1.2 V may be provided via that pin as the name implied. The voltage supplied via the VDDIO1V2_AON pin may correspond to an always-on regulator output from the leader PMU 152. Thus, the VDDIO1V2_AON pin may be supplied voltage via a rail from the always-on regulator. The VDDIO1V2_AON pin may also be coupled to ground via a capacitor 160C. The always-on regulator may be an always-on LDO. The always-on regulator may sometimes be powered down when the PMU 28 is decoupled from the power source 26 (e.g., before operations of block 52 of FIG. 6), and thus is powered off. The VDDIO1V2_AON pin may provide voltage to the GPIO of PMUs 152, 154, and thus may be generally considered as the logic level used by the GPIO when determining whether a received signal is a high logic voltage value or a low logic voltage value.

The second voltage supply is from a VDDIO_AON pin, which may provide a second voltage on its connected rail and may be coupled to ground via a capacitor 160D. Although referred to as the "second voltage supply," the VDDIO_AON voltage supply comes on before the "first voltage supply" (e.g., VDDIO1V2_AON pin). In this way, the first voltage supply may be based on the second voltage supply since the second voltage supply may power the always-on regulator. The second voltage may correspond to 1.5V, a voltage between 1V and 2V, a voltage greater than 1V but less than 3V, or the like. The first voltage may be 6 times greater than the second voltage (e.g., V1=6*V2) or another suitable integer). The second voltage supply may correspond to a sub-domain of digital logic, which may be a control supply for the GPIO of the PMUs 152, 154. In some cases, the control supply for the GPIOs may correspond to a logic high voltage level. A logic low voltage level may be a voltage less than 1.5V, such as 0.7V, a voltage between 0.5V and 1V, or any suitable value. In some systems, a voltage supplied to an analog domain, VDD_ANA, may be the same as a voltage provided to a digital domain (e.g., VDD_DIG described in FIG. 8), and thus there may be just one always-on logic supply rail shared between both analog and digital domains, as is shown in FIG. 7. Each of the VDDIO_AON pin, VDD_ANA pin, VLDOINT pin are connected to the same VLDOINT pin, which couples the voltages and/or circuitries coupled to those pins internally and externally to each other. Thus, each of these connected pins are coupled to ground via a same capacitor 160D on the controller PMU 152.

In the leaf PMU 154, the VDDIO_AON pin supplies power harvested from the controller PMU 152. Furthermore, in the leaf PMU 154, the VDD_ANA pin and the VLDOINT pin may couple to receive power supplied by an internal regulator 156A of the controller PMU 152, which enables the internal regulator 156B to be shut down during the retention mode (and, in some cases, the normal operating mode), further reducing power consumed during at least the retention mode since voltage supplies are shared between the various PMUs 152, 154. In the leaf PMU 154, the VDD_ANA pin is coupled to the VLDOINT pin, and each are coupled to ground via a capacitor 160E.

When comparing to operations of FIGS. 7 and 8, the leaf PMU 154 may correspond to a first PMU that includes a GPIO operable in a blocking state while receiving a threshold level of voltage from the controller PMU 152 and/or the power source 26. The leaf PMU 154 may be decoupled from the power source 26 during the retention mode (e.g., between a first time and a second time) and may be coupled to the power source 26 when operated in a normal, non-retention mode. The controller PMU 152 may couple to the leaf PMU 154 and provide the threshold level of voltage to the leaf PMU 154 while the electronic device 10 is in the retention mode. The blocking state may correspond to the GPIO being coupled to a voltage rail supplying a logical high voltage level as the threshold level of voltage. In some cases, the blocking state may correspond to the GPIO having a bias between a well and a gate, where the bias is based on the threshold level of voltage between the well and the gate. The blocking state may protect digital logic coupled to the leaf PMU 154 from undesired signals that may be received at the GPIO during the retention mode, where the undesired signal may otherwise damage the digital logic had the GPIO not been operated to maintain the blocking state. The blocking state may also protect unwanted conduction into the GPIO cell that may corrupt data sent to other chips on the shared GPIO bus.

Figure 10:
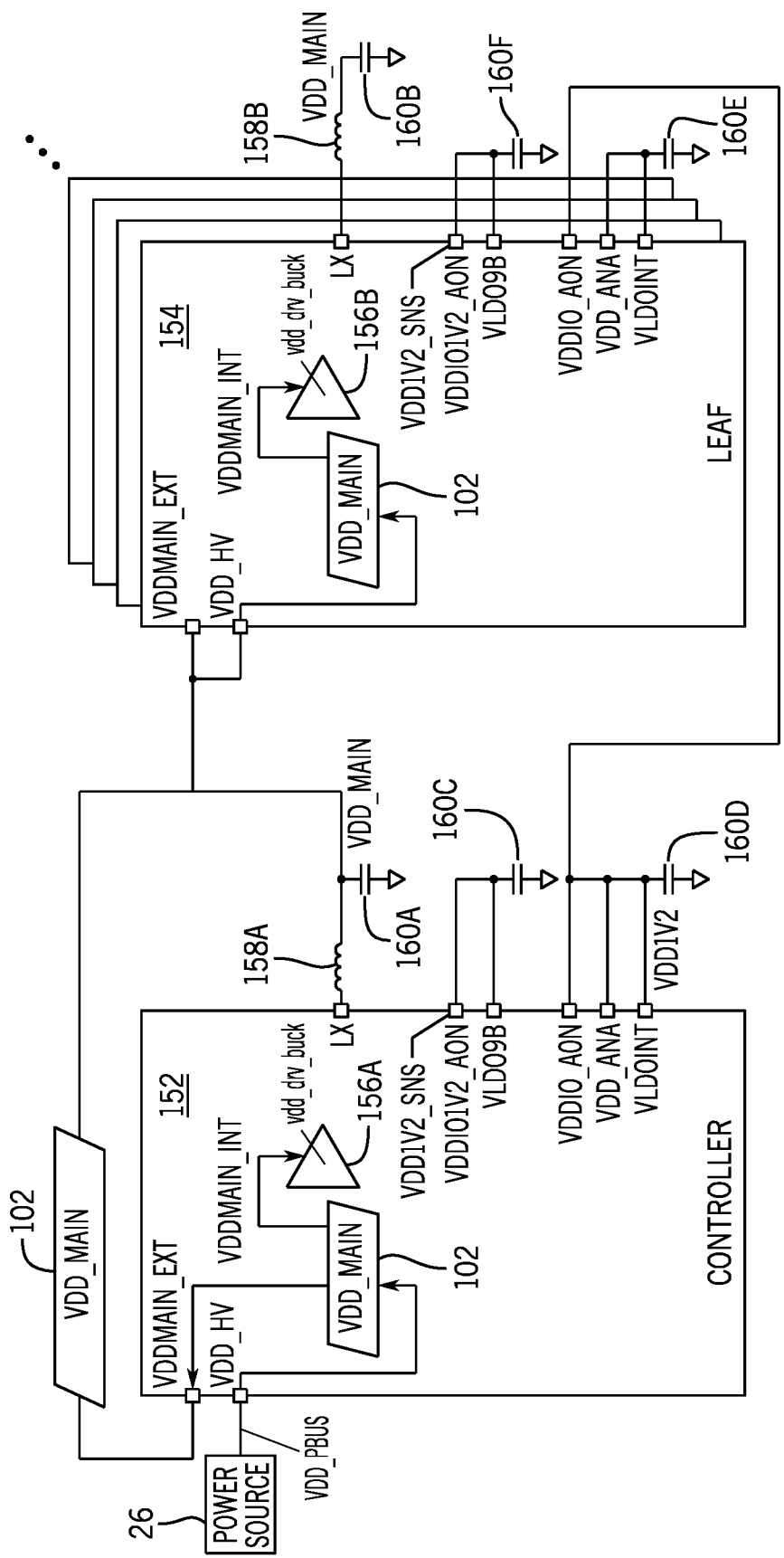
FIG. 10 is a block diagram of the leaf PMU operable to harvest the supply voltage from the controller PMU while in the retention mode based on a third coupling, in accordance with an embodiment.

Although this example shown has both the supply rail from the VDDIOV2_AON pin and the supply rail from the VDDIO_AON pin being harvested, in some systems, one or the other is harvested. For example, FIGS. 8-9 relates to the system where VDDIOV2_AON is harvested without also harvesting VDDIO_AON and FIG. 10 relates to the system where VDDIO_AON is harvested without also harvesting VDDIOV2_AON. Indeed, FIGS. 9 and 10 illustrate unharvested supplies being driven by associated LDOs (e.g., VLDO9B is connected back to VDDIO1V2_AON).

It is noted that each PMU 28 may include multiple devices and a switch node coupled to a regulated power supply node via an inductor 158. For a given switching sequence, the switch node may be coupled to a capacitor 160 using different sets of the multiple devices included in the converter circuit during different cycles of operation of the voltage regulator circuit. As used and described herein, a switching sequence specifies one or more devices of a voltage regulator circuit are activated during each cycle of a plurality of cycles used during the operation of a voltage regulator circuit, and may correspond to the different operational modes of the electronic device 10 and/or different operations of different circuitries of the analog and/or digital domain for the various operational modes of the electronic device 10.

In some embodiments, one or more of PMU 28 (e.g., leaf PMU 154, controller PMU 152), may be implemented on a single semiconductor IC (e.g., die or chip). In some embodiments, one or more of PMU 28 may be implemented on more than a single semiconductor IC. For example, a leaf PMU (e.g., leaf PMU 154) may be implemented as a chiplet on or adjacent to a semiconductor IC comprising a controller PMU (e.g., controller PMU 152). In some embodiments, one or more of PMU 28 are implemented in a chip package as a multi-die module, where one or more distinct die in the multi-die module are communicatively and/or electrically coupled to each other. For example, a controller PMU (e.g., controller PMU 152) and a leaf PMU (e.g., leaf PMU 154), may be packaged laterally adjacent to each other on a surface of an interposer allowing for die to die connections between the controller PMU and the leaf PMU. In some embodiments, one or more of PMU 28 are implemented in a chip package or multi-die module, with a processing IC (e.g., system-on-chip). In some embodiments, one or more passive devices may be packaged with one or more PMU 28. For example, inductor 158 and/or capacitor 160 may be implemented as chiplets on or adjacent to a PMU 28 (e.g., as integrated passive devices mounted on controller PMU 152).

To further elaborate on supply harvesting and the retention mode, FIGS. 8 and 9 refer to a timing diagram and system example, which are described together herein for ease of discussion. FIG. 8 is a timing diagram 100 that illustrates signal 102-116 having various voltage values associated with entering and/or exiting the retention mode and FIG. 9 is a block diagram of the leaf PMU 154 operable to harvest a supply voltage from the controller PMU 152 while in the retention mode based on a second coupling. Example operations are described herein in association with the retention mode. In an actual implementation, one or more of the operations may be adjusted or omitted, or additional operations added, based on the specific configurations and/or uses of that system.

Referring first to the timing diagram 100 of FIG. 8, digital logic may respond to changes in signals 102-116. The signals 102-116 are associated with the electronic device 10 and may operate the analog domain and/or the digital domain in and out of the retention mode. Although discussed in relation to FIG. 9, FIG. 8 may similarly describe supply harvesting and retention mode operations of systems depicted in FIGS. 7, 9, 10, and 11.

In this system of FIGS. 8 and 9, leaf PMU 154 harvests the supply voltage on the rail coupled to the VDDIO1V2_AON pin. The VDDIO1V2_AON pin is coupled to the DLD09B and to ground (e.g., via capacitor 160C). Another coupling is between VDDIO_AON pin, VDD_ANA pin, and VLDOINT pin of the controller PMU 152, which each are coupled to ground via the capacitor 160D. Furthermore, another coupling is between VDDIO_AON pin, VDD_ANA pin, and VLDOINT pin of the leaf PMU 154, which each are coupled to ground via the capacitor 160E. In this system, the digital control voltage level provided via the VDDIO1V2_AON pin may equal or be substantially similar to a logic level of the GPIO. In contrast, the system of FIG. 7 may have used multiple supply rails due to the logic level of the GPIO and the digital control voltage level being different voltages.

To elaborate further on the retention mode, a RESET_L signal 112 may indicate when the electronic device 10 is in the retention mode. The RESET_L signal 112 may control whether the electronic device 10 is in the retention mode. The RESET_L signal 112 may be an active low signal (e.g., "0") and the retention mode may correspond to when the RESET_L signal 112 has the low state. For example, the timing diagram 100 corresponds to the retention mode between time 122 and time 124 and again between time 128 and time 130. The retention mode may correspond to a lower power consuming operational mode of the electronic device 10. As referred to herein, a logic high voltage level may help identify a "1" bit and may correspond to a first voltage level, such as 1.5 volts (V), a voltage between 1V and 2V, a voltage greater than 1V but less than 3V, or any suitable voltage value. A logic low voltage level may help identify a "0" bit and may correspond to a second voltage level, such as a voltage less than 1.5V, such as 0.7V, a voltage between 0.5V and 1V, or any suitable value. The logic low voltage level may be less than the logic high voltage level, and one or both of the logic voltage levels may be used to determine a value of a bit (e.g., to determine whether the bit is a "0" bit or a "1" bit).

A VREF_OK signal 114 may be an active high signal. The VREF_OK signal 114 may indicate that a voltage supply rail is ready to supply power to one or more power domains (e.g., one or more analog domains and/or digital domains). For example, the VREF_OK signal 114 may indicate that a main system voltage rail (e.g., a VDD_MAIN) is ready to be used by the electronic device 10. The VREF_OK signal 114 state is based on the voltage level of the VDD_MAIN rail crossing a threshold voltage 120. In FIG. 8, the threshold voltage 120 corresponds to 2.2 volts (V) and occurs at time 118. It should be understood that the threshold voltage 120 may be any suitable voltage, such as a value between 2 and 2.5 V, 1 and 3 V, a value greater than 1V, or the like.

A VDD_DIG signal 110 may indicate a voltage of a rail supplying power to a digital voltage domain of the electronic device 10. The rail may supply power to a digital LDO or another type of digital regulator associated with the digital domain. A VDD_ANA signal 108 may indicate a voltage of a rail supplying power to an analog voltage domain of the electronic device 10. The rail may supply power to an analog LDO or another type of analog regulator associated with the digital domain.

A VAON_OK signal 116 may be an active high signal. The VAON_OK signal 116 may be set to a high logic level in response to one or more supply rails being ready to supply power to one or more analog domains and/or digital domains. For example, the VAON_OK signal 116 may indicate when one or more always-on supply rails and/or LDOs are ready to be used by circuitry of the electronic device 10.

Once both the analog domain and the digital domain are suitably powered (e.g., the voltage of the respective rails supplying power to the respective domains both exceed a voltage threshold), such as at time 126 and at time 132, the VAON_OK signal 116 may be operated to a logic high level and may continue to indicate when analog domain and the digital domain are suitably powered. Thus, at time 128, the VAON_OK signal 116 may be operated to a logic low while the electronic device 10 is in the retention mode 140 and the voltage of the VDD_ANA signal 108 and/or the VDD_DIG signal 110 reduces to below that threshold amount.

A VDD_MAIN signal 102 may indicate a voltage of a main power supply of the electronic device 10 (e.g., VDD_MAIN rail). A PREREG signal 104 may indicate a voltage of a preregulator included in a bandgap associated with the PMU 28. The preregulator may follow a voltage of the VDD_MAIN rail while in a bypass mode, which enables the preregulator not to consume current and enables the retention mode to consume relatively low amounts of power. When the electronic device exits the retention mode (e.g., when RESET_L signal has a logic high state), the preregulator turns on (at time 124), causing a dip in the voltage indicated by the PREREG signal and increasing performance of the band gap associated with a relatively higher performance power bandgap mode 138.

A VREF_0V6 signal 106 may indicate a voltage of a reference generated from the bandgap. Voltage may be supplied to the VREF_0V6 rail after voltage provided via VDD_MAIN rail (e.g., VDD_MAIN signal 102) has reached the threshold voltage 120 (e.g., 2.2 V or other suitable threshold). The portion of VREF_0V6 signal 106 corresponding to the lower power bandgap mode 136 (associated with the retention mode) may be used to keep an output capacitor biased while the electronic device 10. This output capacitor may correspond to one or more of the capacitors 160 in FIG. 7. Maintaining the charge of one or more capacitors during the reduced power mode may reduce a total time to return to a normal power mode or return full power supply to the electronic device 10 since time is not spent charging the capacitors.

The retention mode may also be used to maintain a threshold amount of voltage difference between the VDD_MAIN signal 102 and the VREF_0V6 signal 106 as the bandgap voltage. In this way, the retention mode may be used to maintain the bandgap voltage in the higher performance bandgap mode 138. The higher performance bandgap mode 138 may enable the electronic device 10 to maintain the bandgap voltage. A higher performance bandgap mode 138 may correspond to a threshold level of computation relatively higher than a lower power bandgap mode 136. The bandgap voltage maintained may vary in its voltage difference over time. Indeed, maintaining a more steady or more consistent voltage difference may use more circuitry and/or consume more power than desired for the retention mode 140. Thus, by having a system more flexible in the bandgap voltage maintained may enable further power consumption reductions. The relative voltage between the VREF_0V6 signal 106 and ground may correspond to a reference voltage. The PMU 28 may generate the reference voltage independent of the VDD_ANA signal 108 and the VDD_DIG signal 110.

At some time, the electronic device 10 may be operated back into the retention mode 140. To do so, the RESET_L signal 112 may be changed to a logic low signal at time 128. While reentered into the retention mode, voltages to the analog and digital domains may be reduced to zero (indicated by the decrease in voltage value of the VDD_ANA signal 108 and the VDD_DIG signal 110. The bandgap voltage may be reduced to a lower power bandgap mode 136, which corresponds to increased voltages being provided to the preregulator (e.g., visualized by the value of the PREREG signal 104). Since the VREF_OK signal 114 is generated in response to the VDD_MAIN signal 102 crossing the threshold voltage 120, the VREF_OK signal 114 is maintained at a logic high voltage level during the retention modes 140. However, since power was removed to the digital domain and analog domain when entering the retention mode, the VAON_OK signal 116 is operated to a logic low voltage level until time 132 in a normal operation mode the VDD_DIG signal 110 is returned to operational on voltage levels after the retention mode 140 is exited again at time 130. To exit the retention mode at time 130, the RESET_L signal is operated to a logic high voltage and, in response, the bandgap voltage is increased via the PREREG signal 104 at an at least partially time duration as power being returned to the analog and digital domains via the VDD_ANA signal 108 and the VDD_DIG signal 110. In some systems, a time 134 between time 130 and time 132 may be less than 4.1 milliseconds (ms), such as between 2 ms and 3.5 ms, 1 ms and 2 ms, 2.5 ms and 4 ms, or the like. This transition time between the retention mode 140 and an increased power mode 142 may be relatively less than some systems operating that are not employing one or more of the systems and methods described herein. For example, as described above, maintaining a charge of one or more of the capacitors 160 may reduce a power on time when exiting the retention mode 140 as opposed to letting the capacitors 160, while in the retention mode 140, return to a zero voltage charge otherwise corresponding to a power off mode 144.

Another example may be illustrated in FIG. 10. FIG. 10 is a block diagram of the leaf PMU 154 operable to harvest a supply voltage from the controller PMU 152 while in the retention mode based on a third coupling. In this example, the third coupling is between the VDDIO_AON pins of the respective PMUs 152, 154 and is coupled to ground through capacitor 160D. An additional coupling is between the VDDIO1V2_AON pin and the VLDO9B pin, which is coupled to ground via capacitor 160C on both the controller PMU 152 and the leaf PMU 154. The source voltages (e.g., VDDIO1V2_AON pins) may be unbiased, or driven by the on chip VLDO9B supply, and the VLDOINT rails and/or the VDDIO_AON rails may be harvested so that wells and gates of the GPIOs may be pulled up to the second voltage provided via the VDDIO_AON pin on the connected rail. The VDDIO_AON is harvested between the controller PMU 152 and the leaf PMU 154. The VDD_ANA pin and the VLDOINT pin may be coupled to ground via capacitor 160E. By operating in this manner, even if one or more of the VDDIO1V2_AON pins are grounded, the PMUs 28 may respectively operate the GPIOs at a high impedance (HI-Z) at least part by the wells and gates of the GPIOs being pulled up to the second voltage.

The PMUs 28 of FIGS. 7, 9, and 10 described above may be based on PMUs 28 that may be programmed into a leaf or controller mode. The PMUs 28 may be programmed into either a leaf or a controller based on data stored in a register loaded when the electronic device 10 is powered on. Moreover, the PMUs 28 of FIGS. 7, 9, and 10 described above may include multiple leaf PMUs 154 coupled to the supply rails of one controller PMU 152.

In some systems, the PMUs 28 are not configurable and may be designed specifically with a regulator 156 (e.g., controller PMU) or without the regulator 156 (e.g., leaf PMU). In some systems, it may be desirable to couple more than one leaf PMU 28 to one or more controller PMUs 28. Sometimes, two types of controller PMUs 28 may be used, where different combinations of signals are harvested between these controller PMUs 28.

Figure 11:
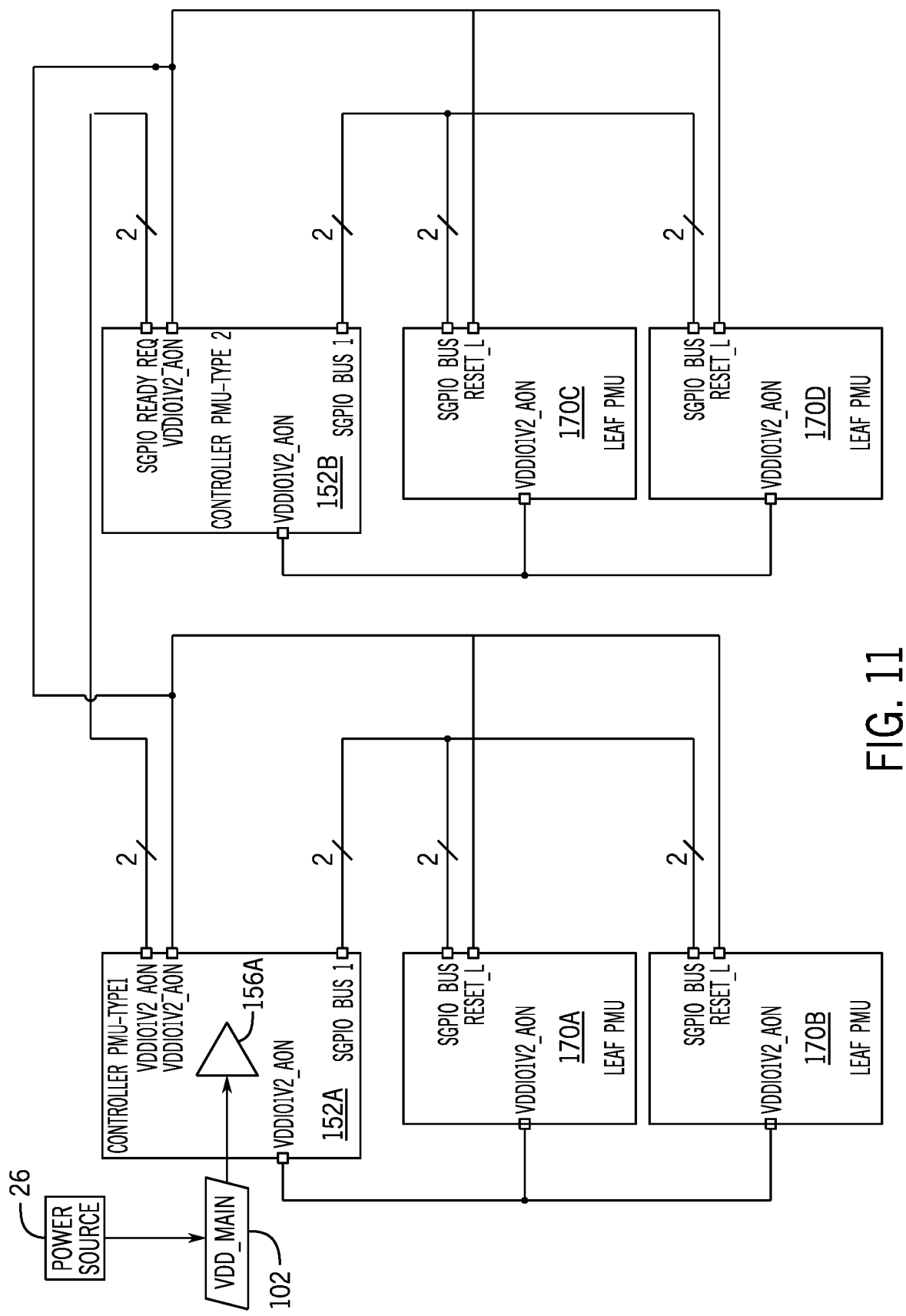
FIG. 11 is a block diagram of multiple leaf PMUs operable to harvest a supply voltage from a first type of controller PMU and a second type of controller PMU while in the retention mode based on a fourth coupling, in accordance with an embodiment.

To elaborate, FIG. 11 is a block diagram of multiple leaf PMUs 28 operable to harvest a supply voltage from a first type of controller PMU 28 (e.g., leader controller PMU 152A) and a second type of controller PMU 28 (e.g., follower controller PMU 152B) while in the retention mode based on a fourth coupling. The leaf PMUs 28 of FIG. 11 (e.g., leaf PMU 170A, leaf PMU 170B, leaf PMU 170C, leaf PMU 170D) may be designed to omit or bypass one or more regulators 156, and thus may be considered different in this way from the reconfigurable leaf PMUs 154 described above. Other pins of the leaf PMUs 170 may be similar to the leaf PMUs described above and thus descriptions are relied upon herein. The leaf PMUs 170 may have no ability to generate their own bias and thus may be designed to harvest supply voltages from a controller PMU 152.

The first type of controller PMU 152A may be coupled to the second type of controller PMU 152B via one or more voltage rails. The second type of controller PMU 152B may receive voltages from the first type of controller PMU 152A via the one or more voltage rails. The first type of controller PMU 152A may regulate the voltages supplied via the one or more voltage rails and/or the second type of controller PMU 152B may regulate the voltages supplied via the one or more voltage rails to adjust the voltages for supplying to downstream circuities. In some cases, the first type of controller PMU 152A may provide one or more timing or control signals to the second type of controller PMU 152B to synchronize operations among the controller PMUs 152. This may enable the second type of controller PMU 152B to omit or disable one or more portions of its circuitry based on its configuration into the second type of controller PMU 152B, enabling further power savings while in the retention mode.

The controller PMUs 152 may provide connected leaf PMUs 170 with an always-on (AON) voltage supply. The leaf PMUs 170 may harvest (e.g., via a shared rail) and monitor the quality of the AON voltage from the controller PMUs 152. The AON voltage supply may be provided on the rail from the VDDIO1V2_AON pin. The voltage may be a suitable value between 1V and 1.5V, such as 1.2V, 1.3V, or the like. The leaf PMUs 170 may be operated to harvest the VDDIO1V2_AON pin supply voltage in both the retention mode and the normal mode. Thus, the example illustrated in FIG. 11 shows the leaf PMUs 170 harvesting not just the supply for its GPIO while in the retention mode but also harvesting the supply from the controller PMU 152A as their main supply. By doing so, each leaf PMU 170 may consume lower amounts of power overall relative to the leaf PMUs 154, which continue to use a regulator 156 during the normal mode, and/or other PMUs 28 that may not perform supply harvesting.

Indeed, this system of FIG. 11 may include a first power management unit (PMU) (e.g., controller PMU 152A) and multiple power management units (PMUs) (e.g., leaf PMUs 170), wherein the multiple PMUs may, respectively, harvest a supply voltage from the first PMU and provide the voltage to one or more corresponding GPIO pins. The multiple PMUs may do so via a direct coupling. The leaf PMUs 170A and 170B may be directly coupled to the controller PMU 152A, the controller PMU 152B may be directly coupled to the controller PMU 152A, and the leaf PMUs 170C and 170D may be directly coupled to the controller PMU 152B. The leaf PMUs 170A-170D may each maintain a bias of the GPIOs and/or pull the GPIOs to a logic high voltage level based on the regulator 156A of the controller PMU 152A. Each leaf PMU 170A-170D may lack a regulator and thus may operate to harvest the supply voltage from the controller PMU 152A during each operational mode of the electronic device 10, such as during both retention mode and normal mode.

Technical effects described herein include systems and methods that maintain a GPIO bias of power management circuitry (e.g., PMU) to improve an ability of the GPIO to protect circuitry of the electronic device even while the electronic device is operated in a retention mode. The systems and methods described herein may enable one PMU to share a voltage rail with one or more other PMU to enable supply harvesting by the one or more other PMUs. When the supply is harvested, the one or more other PMUs may have one or more LDOs and other circuitry removed from power without having the bias of the GPIO lost. In some cases, when supply harvesting to maintain the bias of the GPIO is not suitable for the electronic device, the GPIO pin(s) may be pulled to a logic high level during the retention mode, thereby enabling the GPIO to have a high impedance by which to block undesirable signals from transmitting to circuitry of the electronic device, similar to how the bias blocks the undesirable signals.

Based on the examples described above, one system may include a power source, a PMU having a terminal (e.g., GPIO, other type of input and/or output pin) that, at least some of the time, corresponds to a bias state, where the PMU may couple to the power source at a first time. The system may also include digital logic associated with the PMU (e.g., a leaf PMU), where the digital logic may enable an analog domain at a second time (e.g., after a retention mode exit of FIGS. 6 and 8) and in response to an event generated by the PMU. Before the first time, the PMU may receive a threshold amount of power to maintain the terminal in the bias state while the PMU is decoupled from the power source. The bias state may correspond to a voltage between a well and a gate of the GPIO. The PMU may do so by harvesting a voltage via a direct coupling to second PMU that is coupled to the power source. Both the PMUs may include a regulator. The retention mode may correspond to an operational mode during which regulator in the PMU is removed from power before the first time while the regulator in the second PMU is kept connected to the power source. The regulator may correspond to an LDO. In some cases, the bias state corresponds to a threshold amount of impedance at the terminal used block signals received on the terminal from at least the digital logic. Examples described herein relate to PMUs and GPIOs of the PMUs. It should be understood that maintaining a blocking state of one or more terminals may be applied to various circuitries within the electronic device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:
 a leaf power management unit (PMU) comprising a general purpose input/output (GPIO) operable in a blocking state while receiving a threshold level of voltage, wherein the leaf PMU is configured to be decoupled from a power source between a first time and a second time and coupled to the power source at the second time; and
 a controller PMU configured to couple to the leaf PMU, wherein the leaf PMU is configured to supply the threshold level of voltage to the GPIO between the first time and the second time.

2. The electronic device of claim 1, wherein the blocking state corresponds to the GPIO being coupled to a voltage rail supplying a logical high voltage level as the threshold level of voltage.

3. The electronic device of claim 1, wherein the blocking state corresponds to the GPIO having a bias between a well and a gate based on the threshold level of voltage.

4. The electronic device of claim 3, comprising digital logic configured to couple to the leaf PMU, wherein the bias protects a signal received at the GPIO from reaching the digital logic.

5. The electronic device of claim 1, comprising:
 the power source; and
 digital logic configured to couple to the leaf PMU, wherein the digital logic is configured to enable an analog domain at the second time and in response to an event generated by the controller PMU, the leaf PMU, or both, and wherein before the first time, the controller PMU is configured to receive the threshold level of voltage from the leaf PMU to maintain the GPIO in a bias state corresponding to the blocking state while the controller PMU is decoupled from the power source between the first time and the second time.

6. The electronic device of claim 1, comprising digital logic configured to couple to the leaf PMU, wherein the blocking state corresponds to the GPIO blocking a signal received via the GPIO from the digital logic.

7. The electronic device of claim 1, comprising a plurality of power management units (PMUs) that includes the leaf PMU, wherein the controller PMU is configured to couple to each respective PMU of the plurality of PMUs via a shared rail.

8. Circuitry comprising:
 a power source;
 a power management unit (PMU) configured to supply a terminal, wherein the terminal is configured to, at at least some times, operate in a bias state that corresponds to a voltage between a well and a gate of the terminal, wherein the PMU is configured to couple to the power source at a first time; and
 digital logic configured to couple to the PMU, wherein the digital logic is configured to enable an analog domain in response to the PMU being coupled to the power source at the first time, wherein, before the first time, the PMU is configured to receive a threshold amount of power to maintain the terminal in the bias state while the PMU is decoupled from the power source.

9. The circuitry of claim 8, wherein the terminal comprises a general purpose input/output (GPIO).

10. The circuitry of claim 8, wherein the digital logic is configured to be operated as part of a retention mode that enables one or more states associated with the digital logic to be maintained while the PMU is decoupled from the power source.

11. The circuitry of claim 10, wherein the PMU comprises a linear or low-dropout (LDO) regulator.

12. The circuitry of claim 8, wherein the bias state corresponds to a threshold amount of impedance at the terminal configured to block signals received on the terminal from at least the digital logic.

13. The circuitry of claim 8, comprising a plurality of power management units (PMUs) that includes the PMU, wherein the terminal corresponds to a general purpose input/output (GPIO), and wherein the plurality of PMUs are configured to, respectively, receive a voltage supplied by the power source via harvesting the voltage directly from a second PMU and provide the voltage corresponding to the threshold amount of power to maintain the GPIO in the bias state.

14. A system comprising:
 a first power management unit (PMU); and
 a plurality of power management units (PMUs), wherein the plurality of PMUs are configured to, respectively, harvest a voltage from the first PMU and provide the voltage to one or more terminals, and wherein a respective PMU of the plurality of PMUs comprises a general purpose input/output (GPIO) operable in a blocking state while decoupled from a power source.

15. The system of claim 14, wherein a subset of the plurality of PMUs are configured to, respectively, harvest the voltage from the first PMU via direct coupling to the first PMU.

16. The system of claim 14, comprising a second PMU, wherein a subset of the plurality of PMUs are configured to, respectively, harvest the voltage from the first PMU via direct coupling to the second PMU.

17. The system of claim 14, wherein the first PMU comprises a regulator to generate the voltage, and wherein a respective PMU of the plurality of PMUs maintains a bias of the general purpose input/output (GPIO) based on the voltage from the regulator.

18. The system of claim 14, wherein the first PMU comprises a regulator to generate the voltage, and wherein the plurality of PMUs pull a voltage of one or more general purpose inputs/outputs (GPIOs) to a logic high voltage level based on the voltage from the regulator.

19. The system of claim 14, wherein each respective PMU of the plurality of PMU corresponds to a first type, wherein the first PMU corresponds to a second type, wherein the first type lacks a regulator to supply power to one or more pins of that respective PMU, and wherein the second type comprises the regulator to supply power to the one or more pins.

20. The system of claim 19, wherein the regulator comprises a linear or low-dropout (LDO) regulator.

21. The system of claim 14, comprising a chip package, wherein the chip package comprises a plurality of distinct die including the first PMU and the plurality of PMUs, and wherein one or more distinct die of the plurality of distinct die are communicatively coupled to each other.

* * * * *